United States Patent Office 3,661,800
Patented May 9, 1972

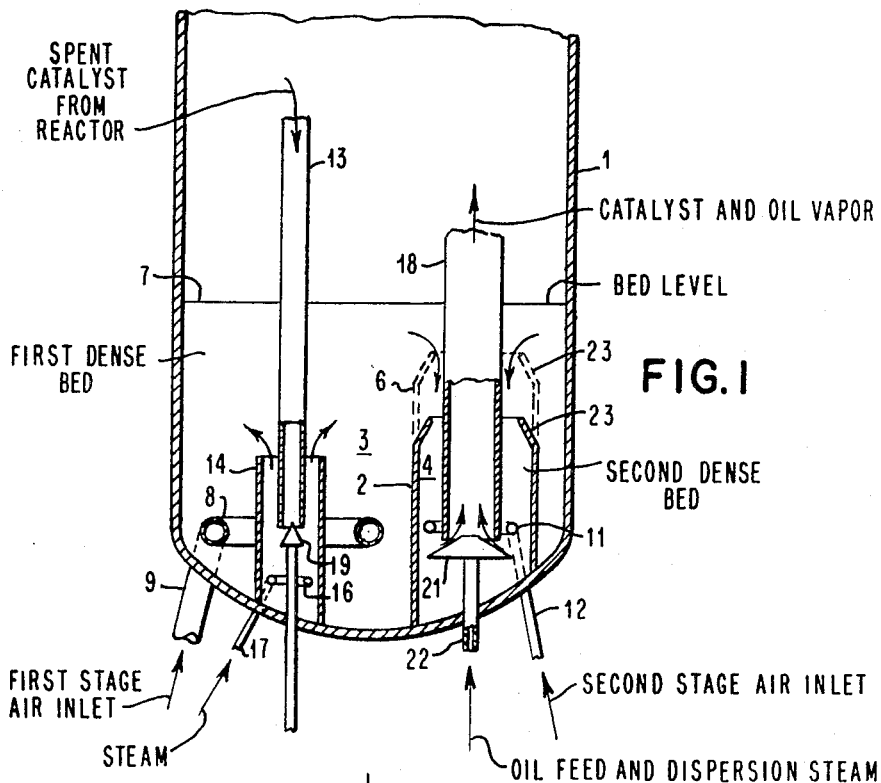
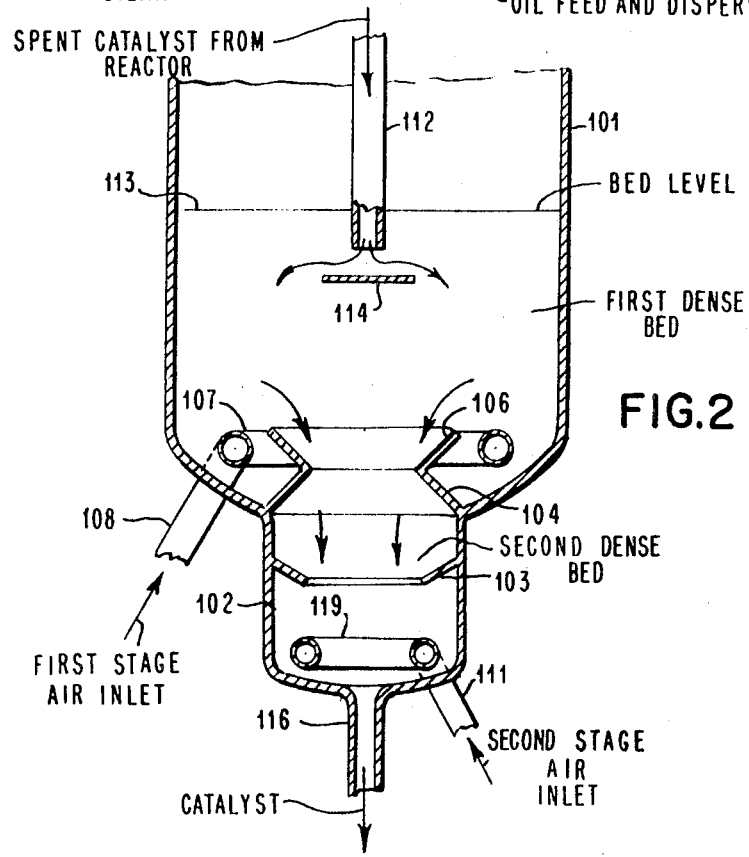
ROBERT W. PFEIFFER
HENRY P. WICKHAM
INVENTORS

3,661,800
STAGED FLUIDIZED SOLIDS CONTACTING PROCESS IN OXIDATION REGENERATION OF CATALYSTS
Robert W. Pfeiffer, Bronxville, and Henry P. Wickham, Upper Brookville, Glen Head, N.Y., assignors to Pullman Incorporated, Chicago, Ill.
Filed June 17, 1970, Ser. No. 46,985
Int. Cl. B01j 11/04, 11/68
U.S. Cl. 252—417     9 Claims

ABSTRACT OF THE DISCLOSURE

A method for staged regeneration of particulate, fluidized material in a unitary vessel having superimposed beds wherein regeneration gas leaving a second stage is passed through a first stage. The method is particularly applicable to the regeneration of hydrocarbon cracking catalyst to low residual levels of carbon.

---

The present invention relates to staged reactions employing fluidized solid material. In one aspect it pertains to a staged process for the oxidative removal of carbonaceous deposits from particulate fluidized material. One specific embodiment thereof pertains to the staged regeneration of spent fluidized catalytic cracking catalysts.

There are a number of continuous processes which employ fluidized solids techniques, e.g. oxidation, hydrogenation, chlorination, hydrocarbon conversion processes, etc. In the latter processes the reaction causes carbonaceous materials to be deposited on the solids in the reaction zone, said solids being conveyed during course of the cycle to another zone where said carbon deposits are at least partially removed by combustion in an oxygen containing medium. The solids from the latter zone are subsequently withdrawn and reintroduced in whole or in part to the reaction zone. Among such processes are fluid coking, fluid hydroforming, fluid catalytic cracking, etc.

One of the more important processes of this nature is the fluid catalytic cracking process for the conversion of relatively high-boiling hydrocarbons to lighter hydrocarbons boiling in the gasoline range. The hydrocarbon feed is contacted in one or more reaction-cracking zones with the particulate cracking catalyst maintained in a fluidized state under conditions suitable for the conversion of hydrocarbons.

The gaseous effluent from the reaction zone is passed to a product recovery zone while the catalyst is generally passed to a stripping zone for removal of strippable hydrocarbons from the particles. The stripped catalyst is subsequently introduced into a fluidized regeneration zone wherein non-strippable carbonaceous material is contacted with an oxygen-containing gas, e.g., air, under conditions such that a major portion of the carbon on the catalyst particles is removed therefrom by combustion. The hot regenerated catalyst is subsequently introduced to the cracking zone for completion of the cyclic process. Provisions are made for recovering and returning catalyst entrained in the gaseous effluents from the reaction and regeneration zones. This is usually carried out by passing the respective effluents through cyclones located in the disengaging spaces of the aforementioned zones; however, other feasible means for recovery of catalyst can equally well be employed, either inside or outside the zones. Although the efficiencies of cyclones and other such equipment for the recovery of the solid catalyst particles are usually very high, some catalyst is always lost from the system, and it is necessary to add fresh "make-up" catalyst to maintain the desired total catalyst inventory at a constant level, and to maintain a high equilibrium activity of the catalyst. Typical daily make-up catalyst rates are between about 0.5 to about 2.0 percent of total catalyst inventory in the system, with the average being about one percent of inventory per day. The major portion of the catalyst losses occur from the regeneration zone, but such losses may be less than the replacement rate which is required to maintain the desired high equilibrium activities in the system, and for this purpose it may also be required to replace a portion of the catalyst inventory with fresh catalyst. It is especially desirable to maintain high equilibrium activities when employing the highly active zeolite or molecular sieve type of cracking catalysts.

Since the aforementioned sieve catalysts are relatively expensive, it is evident that operations requiring larger inventories and therefore larger catalyst make-up rates tend to be less economically attractive and vice versa. As most catalyst losses occur in the regeneration zone, which generally is contained within the largest vessel of the system, it is the present practice to employ operating conditions in the regenerator that favor high carbon burning rates, thereby permitting relatively low regenerator inventories. Such operating conditions include high bed temperatures, usually in a region of above 1150° F. and preferably higher than 1175° F., e.g. between about 1200 and 1250° F. Since the carbon burning rate is greatly reduced at low levels of carbon on the regenerated catalyst, present practice usually limits the minimum attainable carbon level to about 0.2 weight percent, and more usually to values in the 0.3–0.4 percent region.

It is known, however, that the level of carbon content on the regenerated catalyst has a great influence on the conversion and product distribution obtained in the reaction zone, especially with short contact time dilute phase cracking reactors. For instance, at constant operating conditions and constant coke production, a downward change in weight percent carbon on regenerated sieve catalyst from about 0.35 to about 0.1 will typically result in an increase in conversion (i.e. gas oil disappearance above 430° F. VT) of about 2.5 volume percent, the increase in conversion being obtained at the expense of decreased production of less valuable heavy fuel oil. Similarly, a decrease in carbon on regenerated sieve catalyst from 0.2 weight percent to about 0.05 weight percent will improve conversion about 2 volume percent or more and improve gasoline yield by about 1.4 volume percent or more.

As mentioned above, carbon burning rates are greatly affected by the level of percent carbon on regenerated catalyst, and low carbon levels will promote the production of more valuable products on the reaction side. However, such low levels will, employing present commercially used methods of regeneration, result in huge costly vessels, in the exposure of the catalyst to high temperatures for long periods of time which is known to cause deactivation, and in large catalyst make-up rates from the system due to increased inventories.

In the prior art some methods of staged fluidized dense bed regeneration have been suggested for the purpose of achieving low residual carbon levels on the regenerated catalyst and/or reducing the catalyst inventory. These methods require that the catalyst from the penultimate stage be contacted at relatively high regeneration temperatures with an excess amount of fresh regeneration gas of full strength in the last stage.

These methods further require that the staging be carried out either in separate vessels each containing a dense bed of catalyst and a disperse phase thereabove, or within a single regeneration vessel containing two or more spaced dense beds each having a disperse phase thereabove. In the last stage the combination of relatively high regeneration temperature with considerable quantities of excess oxygen in the partially spent regeneration gas leaving said last stage, often causes severe after-burning problems in the space above the last bed containing the disperse phase.

It is therefore an object of the present invention to provide an improved method for reacting one or more fluidized contacts with a solid material of fluidizable particle size.

It is an object of the present invention to provide an improved method of removing carbonaceous deposits from solid material of fluidizable particle size by combustion.

Another object is to provide a method of regenerating hydrocarbon conversion catalysts to low carbon levels without requiring extremely large catalyst inventories and resultant high catalyst make-up rates. Still another object of the present invention is to provide a method of regeneration of hydrocarbon conversion catalysts which will result in improved yields and product distributions. Yet another object is to provide a method of regenerating hydrocarbon conversion catalyst to low carbon levels at lower average temperature levels than heretofore possible. A further object is to provide a regeneration method wherein problems associated with uncontrolled after-burning have been minimized. Other objects will be apparent from the following description and disclosure.

In accordance with the present invention a method is provided for the staged contacting of at least one fluid reactant with solid material of fluidizable particle size in a unitary reaction vessel, which comprises: maintaining in said vessel two fluidized dense beds of such solid material wherein the upper level of the first bed extends across the total unobstructed cross sectional area of said vessel and a portion of said first bed is directly superimposed on the second bed; passing solid material to said first bed; passing a first stream containing the fluid reactant to said first bed; at least partially converting the reactant in said first bed; passing solid material from said first bed to the second bed; passing a second stream containing the fluid reactant to said second bed, and at least partially converting the fluid reactant contained in said second stream in said second bed.

The invention will be described below in detail as it pertains to the regeneration of spent hydrocarbon conversion catalyst. However, this is not to be construed as a limitation of the invention, since the essential aspects of the invention are common to many other processes employing fluidizable solid material, e.g. catalytic contacting processes, reduction of metallic oxides, etc.

Thus in accordance with a specific aspect of the present invention, a method is provided for staged regeneration of spent hydrocarbon conversion catalyst having carbonaceous material deposited thereon in a unitary regeneration vessel which comprises: maintaining in said vessel two fluidized dense beds of catalyst wherein the upper level of the first bed extends across the total unobstructed cross sectional area of said vessel and a portion of said first bed is directly superimposed on the second bed; passing spent catalyst to said first bed; passing a first fresh oxygen-containing regeneration gas taken from the group consisting of oxygen, air and oxygen-enriched air to said first bed; partially regenerating said spent catalyst in said first bed; passing partially regenerated catalyst to the second bed; passing a second oxygen-containing regeneration gas to said second bed; further regenerating partially regenerated catalyst in said second bed.

In one embodiment the invention pertains to a two-stage process in which the oxygen-containing regeneration gas which is passed to the second bed is taken from the group consisting of air, oxygen and oxygen-enriched air.

In another embodiment the process involves more than two stages in which such a gas is fed to the last stage and passed successively through each preceding regeneration stage such that the regeneration gas passed to the second bed is comprised of a partially spent regeneration gas.

The oxygen-content of the spent regeneration gases leaving the upper level of the first bed should be maintained at a sufficiently low concentration to prevent uncontrolled afterburning by the combustion of CO with excess oxygen to $CO_2$ in the upper portion of the regeneration vessel containing the dilute phase. It is desired, however, to maintain some afterburning therein to generate heat which is to a great degree recovered by the catalyst particles entrained in the spent regeneration gases and which are subsequently returned to the dense bed by, for instance, one or more cyclone diplegs. The effect of controlled afterburning is an increase in the regeneration temperature at otherwise constant conditions. At regeneration bed temperatures above 1150° F. the oxygen-content of the spent regeneration gas leaving the upper level of the first bed should not be more than about 4.0 mole percent and preferably should be maintained between about 0.5 and about 2.0 mole percent. At the above-mentioned temperatures and oxygen concentrations and at normally employed gas velocities, controlled afterburning of less than 125° F. (as measured by the temperature difference between the flue gases at the top of the disperse phase of the regenerator vessel and the first bed) can be maintained, and generally is held between 25° F. and 75° F.

In a properly designed fluidized dense bed operating at normally employed superficial gas velocities, e.g. above about 1.0 ft./sec., there is substantially perfect mixing of the particulate solids, and solid samples taken at different locations of such a bed and also from the solids outlet will have virtually the same compositions. The fluidizing gases, however, pass through the bed substantially in plug flow. In the case of regeneration of spent catalyst the fluidizing gas is also reacting and the oxygen concentration of the gas will therefore decrease with the height of the bed. The following table shows the levels of oxygen concentration at different heights of the bed when regeneration air at approximately 21 mole percent oxygen is fed therethrough at about 2.5 ft./sec. gas velocity in quantities such that the spent gas leaving the top of the bed contains about 1.2 mole percent of oxygen.

TABLE I

| Bed distance, percent (bottom to top) | Oxygen concentration, volume percent |
|---|---|
| 0 | 21 |
| 20 | 12 |
| 40 | 7 |
| 60 | 4 |
| 80 | 2 |
| 100 | 1.2 |

The oxygen content of the spent regeneration gas leaving the second bed should be at least 0.5 mole percent and not substantially below that of the spent regeneration gas leaving the first bed. Preferably it should be maintained at a higher level.

Due to the absence of a dilute or gas phase between the beds there is no danger of uncontrolled afterburning of the regeneration gas leaving one bed and passing directly to the next one in spite of the relatively high oxygen-concentration and temperature of said gas.

In one embodiment of the invention the oxygen concentrations of the regeneration gases leaving the first and second beds are not substantially different and the portion of the first bed which is located immediately above the second bed serves mainly as a heat exchange zone. This heat exchange step is an important feature of the invention, in that the temperature of the spent regeneration gas leaving the second bed after the heat exchange is reduced to a level about equal to that of the remaining spent regeneration gas leaving the first bed. Any malfunctioning or mechanical failure of equipment due to uneven temperature distribution in the regenerator space above the upper bed level is thereby minimized or obviated. Furthermore, the heat recovered by this heat exchange of spent regeneration gas from the second bed against the catalyst in the first bed serves to raise the temperature of the first bed and indirectly also the second bed, resulting in increased burning rates in both stages. The heat exchange is carried out quite rapidly and in commercial installations it is generally required only to submerge the inlet to the second bed about 1 to about 3 feet below the upper level of the first bed.

In another embodiment of the invention the oxygen concentration of the spent regeneration gas leaving the second bed is maintained at a level which is higher than that of the gas leaving the first bed. In this embodiment the portion of the first bed which is located immediately above the second bed not only has a heat exchange function but also a regenerating function. The location of the gas outlet from the second stage should be maintained at a distance below the upper level of the first bed such that the oxygen concentration of the regeneration gas passing upwards through the first bed at this elevation is not substantially below the oxygen concentration of the regeneration gas leaving the second bed. Preferably the oxygen concentration of the gas passing upwards through the first bed should, at the aforementioned elevation be about equal to or higher than that of the gas leaving the second bed. In a case where the oxygen concentrations of the aforementioned first and second regeneration gases are about matched at said elevation, the portion of the first bed which is located directly above the second bed is a true extension of the first bed.

It is not necessary, however, that the oxygen concentrations be matched. For instance, the oxygen concentration in the spent gas leaving the second bed can be considerably lower, e.g. less than 50 percent of the percent oxygen in the upflowing gas in the first bed at the same elevation. This is so for instance in those cases where the gas outlet from the second stage bed is maintained near or adjacent to the first bed regeneration gas inlet. Means, e.g. suitable baffles, can be provided in the first bed near the gas outlet from the second bed which will aid in mixing the regeneration gas leaving the second bed with the first stage regeneration gas.

The separation of the beds can be achieved by baffles which form walled chambers of suitable configuration. The baffles can extend from one portion of the vessel wall to another, thus dividing the vessel into sections, in which each section is bounded by a portion of the vessel wall and the baffle. The baffle can also be of a generally cylindrical shape and having a cross sectional area which is less than that of the main vessel and placed such that the first stage bed is contained in the annular portion of the vessel surrounding the cylindrical vertical baffle with, e.g., the second stage bed being maintained within the cylindrical baffle structure. Within the first baffle structure, there can be placed additional baffles, serving to provide additional stages, each such stage containing a dense fluidized bed of catalyst. The cross sectional area of the enclosing baffle structures can be of other shapes than circles, e.g. ellipses are advantageous especially when it is not feasible to place the second stage in the center of the regeneration vessel. Alternately, the second bed can be placed directly below the first bed, the beds being separated by means for preventing significant backmixing of catalyst from the second bed to the first one.

The configuration of the lower portion of the regenerator vessel will depend in part on the desired location of the second stage gas outlet. In case of locating the outlet just a few feet below the upper level of the first bed and employing the portion of the first bed which is located directly above the second bed mainly as a heat exchange zone as described hereinbefore, the two beds are usually maintained in a virtually horizontal relationship to each other, and the portion of the lower vessel containing these beds is then of a uniform diameter.

As the oxygen concentration of the spent gas leaving the second bed is increased and the distance of the outlet from the second bed to the upper level of the first bed is also increased, it may be advantageous to provide an extension of smaller diameter to the vessel to contain at least a portion of the second stage in case of a two-stage regeneration process or at least the last stage of a multistage process containing three or more stages.

Means are provided at the catalyst inlet to a subsequent regeneration stage (said inlet also normally serving as the gas outlet) to minimize backmixing of catalyst between stages, i.e. in case of two stage regeneration, flow of catalyst from the second bed back to the first one. Such means are well-known in the art and include, for instance, restrictions of the diameter of the gas outlet by means of baffles to increase the velocity of the catalyst entering the second stage such that the spent regeneration gas from the second stage passes upwards through said opening without significant entrainment of catalyst therein. Other suitable means include a covering, e.g., a dished head, provided with spaced openings therein, the total area of said openings being such that again the velocity of the catalyst entering the second stage is increased. Also, backmixing can be discouraged by maintaining a low gas velocity, e.g. below 1 ft./sec., in the second stage.

Depending upon the positioning of the regenerator vessel with respect to the vessel or vessels containing the reaction and stripping zones, the means and the location for introducing spent catalyst to the first bed can be varied to a great degree. For instance, in stacked cracking installations substantially vertical and internal standpipes and risers are used for transport of catalyst to and from the regeneration zone. Large commercial installations may require the use of one or more risers and one or more standpipes. For this reason, it may also be required to employ in the regeneration zone one or more first stages in parallel and/or one or more parallel second and subsequent stages. As an illustration, a stacked cracking installation with the stripper located above the regenerator may require only one standpipe introducing the spent catalyst from the stripping zone to the regenerator but two risers through which regenerated catalyst is passed. In this case, one first stage may be employed with two parallel and centrally offset second stages from which the outlet risers depend. Each second stage regeneration is carried out in a bed contained within a baffle structure surrounding a lower portion of the riser.

Fresh oxygen-containing regeneration gases which also serve as the fluidizing medium are introduced to the lower portions of at least the first and the last bed. It is also within the scope of this invention to add fresh regeneration gas to any intermediate stage in order to augment the oxygen concentration in that stage. Generally the fresh regeneration gases have the same composition, e.g. air, but it is within the scope of the invention to use fresh regeneration gases of different oxygen concentration, e.g. one of them can be air, while the other can be oxygen-enriched air or even substantially pure oxygen.

A common dilute phase is maintained in the upper portion of the vessel, said portion preferably housing equipment such as cyclones for the recovery of solid particles entrained in the gases leaving the beds. To minimize entrainment rates when relatively high superficial velocities are employed in the lower portion, the upper portion of the vessel may be of a larger diameter than the lower portion.

The operating conditions employed in the process of the invention to achieve low residual carbon levels on the regenerated catalyst, that is below about 0.25 weight percent, include a temperature in the first stage of at least about 1125° F. and preferably in a range from about 1150° F. to about 1275° F. The second stage is maintained at a temperature which is higher than that of the first stage, and it is preferably maintained in a range between about 1200° F. and about 1350° F. Any stages subsequent to the second stage can be at temperatures lower than or about equal to or higher than that of the second stage. Spent catalyst is introduced to the first bed at a temperature which is preferably at least 125° F. below that of the first bed. The pressures employed in the regeneration can range from about atmospheric pressure to superatmospheric pressures. The superficial gas velocities employed in each of the stages should range between about 0.5 ft./sec. and about 6 ft./sec., and preferably between about 1.0 ft./sec. and about 4.5 ft./sec. A major portion of the carbonaceous deposits should be removed in the first stage and preferably this portion should amount to at least 60 percent of the total removal performed in the regeneration process. The oxygen-containing gases are supplied to the stages in amounts commensurate with the desired percentage of carbon removal (taking into consideration the presence of hydrogen in coke) to occur therein and with the desired oxygen-concentration of the regeneration gases leaving the respective stages. Thus, a major portion of the total fresh regeneration gas should be passed to the first stage.

One important advantage of the present invention is the efficient utilization of fluid reactants within a relatively small vessel, since relatively high partial pressures of said fluid reactants can be maintained in the stages subsequent to the first stage, said high partial pressures directly increasing the reaction rates therein, while simultaneously enabling relatively low partial pressures of the reactants to exist at the upper level of the first bed. Said low partial pressures reflect the efficient utilization of the reactant within the overall process. A number of reactions benefit from this special feature and for this reason the invention is not only applicable to the regeneration of spent hydrocarbon conversion catalyst but also to other various solids contacting processes such as reduction of metallic oxides and catalytic processes including those based on oxidation, reduction, hydrogenation, chlorination, substitution and addition reactions.

Another important advantage of the present invention, regardless of what process it is applied to, is that the reactor size necessary to carry out the reaction to the desired completion is considerably smaller and thus less expensive than one employed in single stage operations.

In addition, further advantages are had in processes based on exothermic reactions, e.g. oxidation reactions, in that the additional heat developed in the stage or stages subsequent to the first stage can be in part recovered in the first stage, thereby discouraging undesirable secondary reactions.

Furthermore, in case of exothermic processes employing temperature sensitive solids, e.g. catalysts and especially cracking catalysts, the invention is particularly advantageous in that only a portion of the reaction is carried out at the highest temperatures, and as a result the catalyst residence times at these higher temperatures will be substantially reduced. Still further advantages result from the fact that the distribution of residual carbon on the catalyst is considerably more even than that obtained in conventional regeneration processes. By the use of this invention there are beneficial effects on conversion and product distribution which come from the very low average residual carbon concentrations on the catalyst and there are additional beneficial effects from the more even distribution of carbon on the individual catalyst particles.

Having thus described the invention in general terms, reference is now made to the schematic drawings in order to provide a better understanding of the present invention. It is to be understood that the drawings are only shown in such detail as is necessary for the understanding of the invention, and that various items including instrumentation, control means and other process equipment have been omitted therefrom for the sake of simplicity.

FIG. 1 shows a longitudinal cross section of the lower portion of a cylindrical regeneration vessel, wherein the second stage is wholly contained within said lower portion.

FIG. 2 shows a longitudinal cross section of the lower portion of a regeneration vessel adapted for regeneration of spent hydrocarbon conversion catalyst where part of the second stage bed is contained within an extension of the regeneration vessel.

Referring now to FIG. 1, the lower portion 1 of a cylindrical regeneration vessel is provided with a vertical enclosing baffle structure 2 dividing said lower portion into sections 3 and 4. The height of the vertical baffle can be varied as indicated by the dotted outline 6, since the desired said height depends on the particular operating conditions employed in the regeneration process. A first fluidized bed of catalyst having an upper level 7 is maintained within section 3 and a second fluidized bed is maintained within section 4. Both beds are provided with means for introduction of fluidizing regeneration gas, in this case these means comprise perforated aerating ring 8 supplied by air through line 9 for the first bed and perforated aeration ring 11 supplied by air via line 12 for the second bed. Spent catalyst from the reactor (which is located above the regenerator at least as far as its outlet is concerned) is introduced into the first bed in section 3 by means of standpipe 13. The lower portion of the standpipe is surrounded by a well 14, serving to prevent the entering catalyst from bypassing into the second stage and from direct contact with fresh regeneration air, thereby minimizing the possibility of local and damaging overheating of the catalyst. The well is provided with perforated ring 16 through which aeration steam or air from line 17 is passed. The catalyst is passed through the regeneration stages in the direction indicated by the arrows and is withdrawn from the second bed in section 4 by means of riser 18. Flows in said standpipe and riser are controlled respectively by solid plug valve 19 and hollow plug valve assembly 21. Through the hollow plug valve stem 22 dispersion steam is fed during startup and shutdown operations and hydrocarbon oil feed is passed therethrough during normal operations. In order to prevent backmixing of catalyst from the second bed to the first one, the vertical baffle structure 2 is provided with means for restricting the opening of said structure. This is indicated schematically by inwardly disposed baffle 23. If need be, additional baffles within the upper portion of structure 2 and extending from, for example, the standpipe can be provided to further aid in the prevention of said backmixing of catalyst. Also, baffling (not shown) above the structure can be provided to help distribute the gas from the second bed through the first bed. The second stage baffle structure 2 may, if desired, be extended downwards outside the vessel. In operation spent catalyst is introduced into the first bed contained in section 3 where it is partially regenerated with air, and partially regenerated catalyst from the first bed is further regenerated in the second stage bed in section 4 in the presence of a second stream of fresh regeneration air, which flows upwards and passes into the first bed through the baffled opening.

In FIG. 2, the lower portion 101 of the regeneration vessel is provided with an extension 102 of smaller cross sectional area than portion 101. Within the extension, means provided to divide it into additional communicating sections. Doughnut baffle 103 and additional baffles e.g. disc baffles (not shown) can be provided to ensure that no significant backmixing of catalyst occurs. Similarly the upper portion of the extension is provided with an inwardly disposed baffle 104 to again prevent backmixing of catalyst between the second bed and first bed contained in the larger area portion of the vessel 101. Flared baffle 106 is also provided to aid in distribution of the gases leaving the second stage throughout the bed of catalyst contained thereabove. Fluidizing and regeneration air are introduced to the first and the second bed respectively by means of perforated air ring 107 supplied by air through line 108 and by a similar air ring 119 supplied by air via conduit 111. Spent catalyst is introduced from above through centrally disposed standpipe 112 below first stage bed level 113 and the introduced catalyst is distributed efficiently throughout the first stage bed by means of horizontal baffle 114. Regenerated catalyst is withdrawn through line 116. In operation spent catalyst is introduced into the first stage and distributed throughout the bed. Fresh regeneration gas introduced to said bed partially regenerates the catalyst, and partially regenerated catalyst from the first bed is passed to the second bed where it is contacted with partially spent regeneration gases flowing upwards through the second bed to further regenerate the catalyst, after which it flows further into the second bed where it is contacted with fresh regeneration gas. Control of catalyst flows of spent and regenerated catalyst can be achieved by, for instance, slide valves located in lines 112 and 116. It is to be understood that additional staging can be employed by further suitable baffling of extension 102. Furthermore, baffle structure 102 can be extended upwards into the first stage, if desired, e.g. such that the outlet oxygen concentration from the second stage is about equal to the oxygen concentration which exists at the same elevation in the first stage.

The following examples are presented illustrating and comparing the method of the present invention for the regeneration of cracking catalysts to very low residual carbon levels, i.e. 0.05 weight percent carbon on catalyst in the systems depicted in the drawings or modifications thereof, with a conventional regeneration method to the same residual carbon level. In all cases, a commercially available molecular sieve type catalyst is regenerated with air at 20 p.s.i.g. The catalyst which has previously been contacted with a heavy gas oil under cracking conditions in a reactor zone and subsequently been stripped of strippable coke in a stripping zone enters the first stage at a temperature of 892° F. The residual coke after stripping contains about .8 weight percent hydrogen and the percent carbon on the spent catalyst is 0.85 weight percent. Other common operating conditions include a $CO_2/CO$ ratio of 0.9 in the gas leaving the first bed and a ratio of 1.5 in the flue gas exiting the regenerator vessel. A 30° F. afterburn is maintained in the dilute phase above the first bed by burning a portion of the carbon monoxide exiting the first bed.

EXAMPLE 1

In this example the regeneration is carried out in a conventional single stage fluidized dense bed operation. Air is fed to the regeneration vessel in amounts such that the oxygen-concentration of the spent gas leaving the upper level of the bed is about 1.2 mole percent. The required time to achieve the regeneration from 0.85 to 0.05 weight percent carbon on catalyst is about 6.58 minutes at about 1225° F. catalyst bed temperature.

EXAMPLE 2

The regeneration of the same catalyst of Example 1 at the same conditions of catalyst flow rate, inlet temperature, and regeneration pressure is carried out in a two-stage operation for instance in an apparatus such as the one depicted in FIG. 1. 75% of the total removal of carbon is obtained in the first bed and 25% in the second bed. Air is fed to each of said beds in amounts that the spent regeneration gases leaving the first and second beds both have an oxygen concentration of 1.2 mole percent. The gas outlet from the second bed is maintained below the upper level of the first bed at a distance therefrom representing 12 percent of the total effective first bed height. The temperature of the first stage bed is maintained at 1174° F. and that of the second bed at 1227° F. In this case the portion of the first bed located directly above the second one primarily performs a heat exchange function and very little if any regeneration can be attributed to the addition of the oxygen-lean spent gas from the second stage. The total time required to regenerate the catalyst to 0.05 weight percent residual carbon is about 4.24 minutes, 2.09 minutes thereof required for the first stage regeneration.

EXAMPLE 3

This example is a modification of Example 2, in which the percent carbon removal in the stages and the apportioning of air to the first and second stage beds has been varied. In accordance therewith the locations of the gas outlet from the second stage with respect to the upper level of the first stage has been moved to a point (about 50% of the first bed height) where the oxygen concentration of the first and second stage regeneration gases are both about 5 mole percent. The oxygen outlet concentration from the first bed is still maintained at 1.2 mole percent. 90% of the total carbon removal is achieved in the first stage at about 1205° F., and 10% in the second bed at about 1226° F. The required time to regenerate the catalyst down to a 0.05% residual carbon content is 4.21 minutes of which 3.78 minutes is the first stage residence time.

EXAMPLE 4

This example shows the result of a three stage regeneration carried out for example in the apparatus shown in FIG. 2 wherein the second stage gas outlet is adjacent to the first stage regeneration air inlet. 75% of the total carbon removal is performed in the first stage. About 100% excess oxygen over that required for carbon removal performed in the second stage is fed to the second stage resulting in oxygen concentrations out of the second stage of about 10 mole percent while the oxygen concentration of the gas leaving the first stage is maintained at 1.2 mole percent. The bed temperatures of the first and second stages are 1188° F., and 1224° F. and the times required for the regeneration of the catalyst to about 0.05 weight percent carbon on catalyst are about 2.87 minutes and 0.42 minutes respectively.

Many modifications and alterations of this invention will be apparent to those skilled in the art without departing from the spiirt and scope of the present invention which is limited only by the claims.

What is claimed is:

1. A method of regeneration in a unitary vessel of spent hydrocarbon conversion catalyst having carbonaceous material deposited thereon which comprises:
   (a) maintaining in said vessel a first fluidized dense bed of catalyst extending across the total unobstructed cross-sectional area of said vessel wherein said first bed is superimposed in direct communication with the upper portion of a separate second fluidized dense bed of catalyst and said first bed at least partially surrounds said second bed;
   (b) passing spent catalyst to said first bed;
   (c) introducing a first oxygen-containing regeneration gas taken from the group consisting of air, oxygen, and oxygen enriched air to a lower portion of said first bed and passing said gas upwardly through said first bed whereby a major portion of carbonaceous material is removed;
   (d) passing catalyst from said first bed to said second bed;
   (e) introducing a second oxygen-containing regenerating gas to said second bed and passing said gas upwardly through said second bed and then through a part of said first bed;
   (f) withdrawing depleted oxygen-containing gas from above said first bed; and
   (g) withdrawing catalyst from said second bed.

2. A method according to claim 1 wherein the temperature of said first bed is at least 1125° F. and oxygen content of said depleted oxygen-containing gas is less than about 4.0 mole percent.

3. A method according to claim 1 in which the oxygen concentration of the regeneration gases leaving the first and the second beds are about equal.

4. A method according to claim 1 in which the oxygen-concentration of the regeneration gas leaving the second bed is higher than that leaving the first bed.

5. A method according to claim 1 in which the oxygen-concentration of the regeneration gas leaving the second bed is maintained at a level which ranges from below to not substantially above that of the first bed regeneration gas at a location adjacent to the second bed gas outlet.

6. A method according to claim 1 in which at least 60 percent of the total carbon removal is carried out in the first bed.

7. A method according to claim 2 in which the temperature of the spent catalyst before it is passed to the first bed is at least 125° F. below that of the first bed.

8. A method according to claim 2 in which the temperature of the first bed is maintained between about 1150° F. and about 1275° F. and the temperature of the second bed is maintained between about 1200° F. and 1350° F.

9. A method according to claim 2 in which the oxygen-content of the regeneration gas leaving the first bed is maintained between about 0.5 and about 2 mole percent.

References Cited

UNITED STATES PATENTS

| | | | |
|---|---|---|---|
| 2,621,118 | 12/1952 | Cyr et al. | 23—288.3 S |
| 2,394,710 | 2/1946 | McAffe | 252—417 |
| 2,488,406 | 11/1949 | Hirsch | 23—288.3 S |
| 3,494,858 | 2/1970 | Luckenbach | 208—164 |
| 3,563,911 | 2/1971 | Pfeiffer et al. | 252—417 |
| 3,351,548 | 11/1967 | Payne et al. | 208—120 |

DANIEL E. WYMAN, Primary Examiner

P. E. KONOPKA, Assistant Examiner

U.S. Cl. X.R.

23—284, 284 S; 75—2.6, 9; 208—155, 164; 252—419; 266—15